Patented Nov. 21, 1944

2,363,047

UNITED STATES PATENT OFFICE 2,363,047

CERTAIN WATER-SOLUBLE HIGH MOLAL OXYALKYLATED ESTERS AND METHOD OF MAKING SAME

Melvin De Groote, University City, and Bernhard Keiser, Webster Groves, Mo., assignors to Petrolite Corporation, Ltd., Wilmington, Del., a corporation of Delaware No Drawing. Original application March 21, 1941, Serial No. 384,602. Divided and this application June 26, 1942, Serial No. 448,688

12 Claims. (Cl. 260—404.5)

This invention relates to a new chemical product or compound, our present application being a division of our co-pending application Serial No. 384,602, filed March 21, 1941, which subsequently matured as U. S. Patent No. 2,295,170, dated September 8, 1942.

One object of our present invention is to provide a new material, compound or composition of matter, that is capable of use for various purposes, and particularly adapted for use as a demulsifier in the resolution of crude oil emulsions.

Another object of our invention is to provide a practicable method for manufacturing said new material, compound or composition of matter.

The new chemical compound or composition of matter which constitutes our present invention is exemplified by the acidic, or preferably, the neutral ester derived by complete esterification of one mole of a polyalkylene glycol of the kind hereinafter described, with two moles of a fractional ester derived from a hydroxylated material of the kind herein described, and a polybasic carboxy acid having not over six carbon atoms.

If a hydroxylated material, indicated for the sake of convenience by the formula T.OH, in which T is an alcoholic residue, is reacted with a polybasic carboxy acid, which, similarly, may conveniently be indicated as being of the dibasic type, by the formula HOOC.D.COOH, in which D is a dicarboxy acid residue, then the fractional ester obtained by reaction between equimolar quantities may be indicated by the following formula:

HOOC.D.COO.T

The polyethylene glycol may be characterized by materials of the kind such as heptaethylene glycol, octaethylene glycol, nonaethylene glycol, decaethylene glycol, to and including heptadecaethylene glycol. For convenience, these polyethylene glycols may be indicated by the following formula:

in which $m$ varies from 7 through 17.

Instead of polyethylene glycols, one may use polypropylene glycols or polybutylene glycols. Thus, for convenience, in the broadest aspect, the polyalkylene glycols employed may be indicated by the following formula:

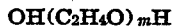

in which $m$ has its previous significance and $n$ represents a numeral varying from 2 to 4.

Thus, the bulk of the materials herein contemplated, particularly for use as demulsifiers, may be indicated within certain variations, as hereinafter stated, by the neutral ester derived by esterification of one mole of a glycol of the kind above described, with two moles of a fractional ester of the kind previously described. The formation of the compound may be indicated by the following reaction, although obviously, it is immaterial what particular procedure is employed to produce the particular chemical compound or product:

T.OOC.D.COOH+OH(C₂H₄O)ₘH
+HOOC.D.COO.T→

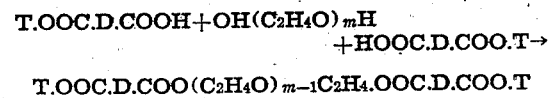

As indicated previously, the polybasic acids employed are limited to the type having not more than six carbon atoms, for example, oxalic, malonic, succinic, glutaric, and adipic. Similarly, one may employ acids such as fumaric, maleic, glutaconic, and various others, including citric, malic, tartaric, and the like. The selection of the particular tribasic or dibasic acid employed is usually concerned largely with convenience of manufacture of the finished ester, and also of the price of the reactants. Generally speaking, the higher the temperature employed, the easier it is to obtain large yields of the esterified product. Although oxalic acid is comparatively cheap, it decomposes somewhat readily at slightly above the boiling point of water. For this reason, it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable; and also, everything else considered, the cost is comparatively low on a per molar basis, even though somewhat higher on a per pound basis. Succinic acid or the anhydride has many of the attractive qualities of maleic anhydride; and this is also true of adipic acid. For purposes of brevity, the bulk of the compounds hereinafter illustrated will refer to the use of maleic anhydride, although it is understood that any other suitable polybasic acid may be employed. Furthermore, for purposes of convenience, reference is made to the use of polyethylene glycols. As has been previously indicated, such glycols can be replaced by suitable polypropylene or polybutylene compounds.

As far as the range of oxyalkylated compounds employed as reactants is concerned, it is our preference to employ those having approximately 8-12 oxyalkylene groups, particularly 8-12 oxyethylene groups. The preference to use the oxyethylated compounds is due largely to the fact that they are commercially available, and particularly so in two desirable forms. The most desirable form is the so-called nonaethylene glycol, which, although consisting largely of nonaethylene glycol, may contain small amounts of heptaethylene and octaethylene glycols, and possibly minor percentages of the higher homologs. Such glycols represent the upper range of distillable glycols; and they may be conveniently referred to as "upper distillable ethylene glycols." There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs, as indicated.

Substantially as desirable as the upper distillable polyethylene glycols, are the lower non-distillable polyethylene glycols. These materials are available in the form of a waxy water-soluble material, and the general range may vary somewhat from deca- to tetradecaethylene glycol. As is well understood, the method of producing such glycols would cause some higher homologs to be formed; and thus, even in this instance there may be present some oxyethylene glycols within the higher range above indicated. One need not point out that these particular compounds consist of mixtures, and that in some instances, particularly desirable esters are obtained by making mixtures of the liquid nonaethylene glycol with the soft, waxy, lower non-distillable polyethylene glycols. For the sake of convenience, reference in the examples will be to nonaethylene glycol; and calculations will be based on a theoretical molecular weight of 414. Actually, in manufacture, the molecular weight of the glycol employed, whether a higher distillable polyethylene glycol, or a lower non-distillable polyethylene glycol, or a mixture of the same, should be determined and reaction conducted on the basis of such determination, particularly in conjunction with the hydroxyl or acetyl value.

It has been previously pointed out that it is immaterial how the compounds herein contemplated are manufactured, although we have found it most desirable to react the selected glycol or mixtures of glycols with maleic anhydride in a ratio of two moles of the anhydride for one mole of the glycol. Under such circumstances, we have found little tendency to form longer chain polymers; and in fact, the product of reaction, if conducted at reasonably low temperatures, appears to be largely monomeric. For convenience, such intermediate product may then be considered as a dibasic or polybasic acid. One mole of the intermediate so obtained is then reacted with two moles of the alcoholic material of the kind subsequently described.

It is to be noted, however, that if one prepares a fractional acidic ester, then if two moles of the fractional acidic ester are reacted with one mole of the polyethylene glycol, there is no possibility for the formation of polymeric types of esterification products under ordinary conditions.

The alcoholic compounds employed as reactants in the manufacture of the new compounds or reagents herein described, are materials conveniently referred to as the amides of high molar alcohol acids or high molar hydroxy acids. Such amides are derived from the high molar hydroxy acids. Like the high molar hydroxy acids, they are invariably water-insoluble.

Since the amides are derivatives of the high molar hydroxy acids, it is most convenient to indicate the variety of high molar hydroxy acids which may be converted into amides or substituted amides. The commonest example of a high molal hydroxy acid is ricinoleic acid. Other hydroxy fatty acids include hydroxystearic acid, dihydroxystearic acid, diricinoleic acid, aleuritic acid, and the like. Similar acids are obtained in the oxidation of paraffin, petroleum hydrocarbons, or wax, and are commonly referred to as hydroxylated wax acids. Hydroxylated wax acids occur as by-products in the oxidation of waxes or similar materials, and are usually separated so that the commonest commercial form of oxidized wax acids represent mixtures comparatively free from the hydroxylated compounds. Hydroxylated acids are produced by other procedures, such as chlorination, either by addition or substitution, as, for example, chlorination of oleic acid or stearic acid. Subsequent reactions involve the removal of the chlorine with the introduction of a hydroxyl radical. Undecylenic acid, derived from castor oil, has been converted into a hydroxy undecenoic acid. Unsaturated hydroxy acids, such as ricinoleic acid, may be treated in various manners, so as to produce derivatives, for example, chlorinated or brominated ricinoleic acid. Such materials are entirely satisfactory for use as reactants in the preparation of materials of the kind herein contemplated. Naturally-occurring naphthenic acids can also be converted into hydroxylated products by following similar procedure. An unsaturated hydroxy acid, such as ricinoleic acid, can be converted into a hydroxylated aryl-stearic acid. Such procedure contemplates reactions such as those involving ricinoleic acid, benzene, and aluminum chloride in large excess, or involves the desulfonation of a sulfo-aromatic fatty acid. In any event, by employing derivatives of undecylenic acid, or one or more of the various wax acids, naturally-occurring naphthenic acid, ricinoleic acid, diricinoleic acid, or derivatives thereof, as previously explained, one can obtain a variety of hydroxylated monocarboxy acids, having at least 11 carbon atoms and not in excess of 36 carbon atoms. Such compounds are the kind herein contemplated as reactants to furnish the alcoholiform hydroxyl.

Hydroxy acids of the kind herein contemplated as reactants for the formation of amides, may also be prepared by the hydrolysis of alpha-halogen acids. For instance, alpha-bromocaproic acid, alpha-bromocaprylic acid, alpha-bromocapric acid, alpha-bromolauric acid, alpha-bromomyristic acid, alpha-bromopalmitic acid, and the like, can be hydrolyzed to give the corresponding alpha-hydroxy acid. Indeed, a reactive alpha-halogen acid may serve as a functional equivalent of an alpha-hydroxy acid by liberation of hydrochloric acid, instead of water. Such type of reaction, however, involves numerous difficulties; and thus, it is better to employ a hydroxy acid.

In some instances derivatives of hydroxylated unsaturated acids are most readily obtained by the employment of an intermediate in which the hydroxyl group is protected. Thus, ricinoleic acid may be acetylated, and such acetyl ricinoleic acid converted into a derivative, for instance, a derivative in which an aryl group is introduced.

Such derivatives can then be saponified or hydrolyzed so as to regenerate the hydroxyl radical.

The manufacture of amides from acids is, of course, comparatively simple. One may employ the acid or a suitable derivative, such as the acyl halide, or preferably, the ester. In many instances it is easier to obtain the amide from an ester derived from a monohydric or polyhydric alcohol than it is from the acid itself.

As to the manufacture of various esters from acids of the kind above described, attention is directed to the following United States patents, to wit: Patents Nos. 1,160,595, dated Nov. 16, 1915, to Gruter et al.; 2,221,674, Nov. 12, 1940, Ellis; and 2,177,407, Oct. 24, 1939, Hansley. See also Organic Syntheses, volume X, page 88.

In any event, the acid or suitable derivative, particularly the ester, is treated with ammonia to produce the amide.

The method of manufacturing the amide requires no elaboration, but simply as illustrative of the art; reference is made to U. S. Patent No. 2,058,013, to Henke and Zertman, dated October 20, 1936.

As to the procedure for manufacture of substituted amides, reference is made to the following United States patents, i. e., Patents Nos. 2,013,108, dated Sept. 3, 1935, to Reppe et al.; 1,475,477, Nov. 27, 1923, Ellis; and 1,954,433, Apr. 10, 1934, Thomas et al.

If low molal amines, particularly primary amines, for example, butylamine, amylamine, aniline, cyclohexylamine, or the like, are substituted for ammonia, one obtains a substituted amide which can be employed satisfactorily in the present process, provided, of course, that the final product is water-soluble. In fact, secondary amines, such as dibutylamine and diamylamine, can be used. Since such materials are generally more expensive than ammonia, and since the hydrocarbon groups present tend to decrease water solubility, there is no added advantage in using such materials, except for some special purposes, such as the resolution of oil field emulsions. If such materials are used, it is preferable that they be derivatives of primary amines, i. e., that the substituted amide contain only one hydrocarbon group, and in any event, that such hydrocarbon group contain not more than 7 carbon atoms, as, for example, derivatives of monoamylamine, cyclohexylamine, aniline, and benzylamine.

In the hereto appended claims reference to amides is intended to include substituted amides in which there is present not more than one hydrocarbon group containing not more than 7 carbon atoms, provided that such materials serve as obvious functional equivalents, i. e., yield water-soluble products. The hereto appended claims are not intended to include substituted amides derived from amines containing hydroxy hydrocarbon radicals, as, for example, monoethanolamine, monopropanolamine, tris(hydroxymethyl) aminomethane, monoglycerylamine, etc.

INTERMEDIATE PRODUCT

Example 1

One pound mole of nonaethylene glycol is reacted with two pound moles of maleic anhydride so as to form nonaethylene glycol dihydrogen dimaleate. The reaction may be shown more simply as if involving the acid instead of the anhydride, thus:

HOOC.C₂H₄COO⋮H+HO⋮CH₂(CH₂OCH₂)₈CH₂⋮OH+H⋮OOC.C₂H₄.COOH

INTERMEDIATE PRODUCT

Example 2

A mixture of lower non-distillable polyethylene glycols, representing approximately deca- to tetradecaethylene glycol, is substituted for nonaethylene glycol in the preceding example.

INTERMEDIATE PRODUCT

Example 3

A 50–50 mixture of nonaethylene glycol and lower non-distillable polyethylene glycols of the kind described in the previous example is substituted for nonaethylene glycol in Example 1.

INTERMEDIATE PRODUCT

Example 4

Adipic acid is substituted for maleic anhydride in Examples 1–3, preceding.

INTERMEDIATE PRODUCT

Example 5

Oxalic acid is substituted for maleic anhydride in Examples 1–3, preceding.

INTERMEDIATE PRODUCT

Example 6

Citric acid is substituted for maleic anhydride in Examples 1–3, preceding.

INTERMEDIATE PRODUCT

Example 7

Succinic anhydride is substituted for maleic anhydride in Examples 1–3, preceding.

COMPOSITION OF MATTER

Example 1

One pound mole of the intermediate product of the kind described in Intermediate product, Examples 1, 2 and 3, above, is reacted with two pound moles of ricinoleoamide, until substantially all dibasic carboxyl acidity has disappeared. Time of reaction may vary from a few hours to as much as 20 hours. The reaction may be indicated in the following manner:

$$\substack{\mathrm{HO\!\cdot\!OC.C_2H_4COO.CH_2(CH_2OCH_2)_8CH_2.OOC.C_2H_4.CO\!\cdot\!OH} \\ \mathrm{H\!\cdot\!ORCON}\diagup^{\mathrm{H}}\diagdown_{\mathrm{H}} \qquad \mathrm{H}\diagup\diagdown\mathrm{NOCRO\!\cdot\!H}}$$

(In the above HORCO is the ricinoleyl radical.)

COMPOSITION OF MATTER

Example 2

The amide of hydroxystearic acid is substituted for ricinoleoamide in the preceding example.

COMPOSITION OF MATTER

Example 3

The amide of dihydroxystearic acid is substituted for ricinoleoamide in Composition of matter, Example 1.

COMPOSITION OF MATTER
Example 4

The amide of chlorinated ricinoleic acid is substituted for ricinoleaoamide in Composition of matter, Example 1.

COMPOSITION OF MATTER
Example 5

The amide of brominated ricinoleic acid is substituted for ricinoleoamide in Composition of matter, Example 1.

COMPOSITION OF MATTER
Example 6

A mixture of hydroxylated oxidized wax acids having an average molecular weight of approximately 250-275, is converted into the corresponding mixture of amides and substituted for ricinoleoamide in Composition of matter, Example 1.

COMPOSITION OF MATTER
Example 7

A mixture of hydroxylated oxidized wax acids having an average molecular weight of approximately 275-300, is converted into the corresponding mixture of amides and substituted for ricinoleoamide in Composition of matter, Example 1.

COMPOSITION OF MATTER
Example 8

A mixture of hydroxylated oxidized wax acids having an average molecular weight of approximately 300-325, converted into the corresponding mixture of amides and substituted for ricinoleoamide in Composition of matter, Example 1.

COMPOSITION OF MATTER
Example 9

In Composition of matter, Examples 1-8, preceding, any residual acidity present is removed by cautiously adding a dilute solution ammonium hydroxide until the resultant product gives a clear, limpid solution in water, particularly in dilute form.

COMPOSITION OF MATTER
Example 10

In Composition of matter, Examples 1-8, preceding, any residual acidity present is removed by cautiously adding a dilute solution of triethanolamine until the resultant product gives a clear, limpid solution in water, particularly in dilute form.

COMPOSITION OF MATTER
Example 11

In Composition of matter, Examples 1-8, preceding, any residual acidity present is removed by cautiously adding a dilute solution of tris-(hydroxymethyl)aminomethane until the resultant product gives a clear, limpid solution in water, particularly in dilute form.

COMPOSITION OF MATTER
Example 12

The same procedure is followed as in Composition of matter, Examples 1-11, inclusive, except that an intermediate product of the kind exemplified by Intermediate product, Example 4, is substituted for that in Intermediate product, Examples 1, 2 and 3.

COMPOSITION OF MATTER
Example 13

The same procedure is followed as in Composition of matter, Examples 1-11, inclusive, except that an intermediate product of the kind exemplified by Intermediate product, Example 5, is substituted for that in Intermediate product, Examples 1, 2 and 3.

COMPOSITION OF MATTER
Example 14

The same procedure is followed as in Composition of matter, Examples 1-11, inclusive, except that an intermediate product of the kind exemplified by Intermediate product, Example 6, is substituted for that in Intermediate product, Examples 1, 2 and 3.

COMPOSITION OF MATTER
Example 15

The same procedure is followed as in Composition of matter, Examples 1-11, inclusive, except that an intermediate product of the kind exemplified by Intermediate product, Example 7, is substituted for that in Intermediate product, Examples 1, 2 and 3.

It is to be noted that this second step is an esterification reaction, and the same procedure is employed as suggested above in the preparation of the intermediate product. Needless to say, any particular method may be used to produce the desired compounds of the kind indicated. In some instances it may be desirable to conduct the esterification reaction in the presence of a non-volatile inert solvent, which simply acts as a diluent or viscosity reducer.

In the preceding examples, attention has been directed primarily to the momomeric form, or at least, to the form in which the bifunctional alcohol, i. e., a glycol, and the poly-functional acid, usually a bifunctional compound, react to give a chain type compound in which the adjacent acid and glycol nucleus occur as a structural unit. For instance, in the monomeric form this may be indicated in the following manner:

$$\text{acid} \ldots \text{glycol} \ldots \text{acid}$$

If, however, one prepared an intermediate product employing the ratio of three moles of maleic anhydride and two moles of nonaethylene glycol, the tendency would be to produce a product which might be indicated in the following manner:

$$\text{acid} \ldots \text{glycol} \ldots \text{acid} \ldots \text{glycol} \ldots \text{acid}$$

Similarly, three moles of the glycol and four moles of the acid might tend to give a combination which may be indicated thus:

$$\text{acid} \ldots \text{glycol} \ldots \text{acid} \ldots \text{glycol} \ldots \text{acid} \ldots \text{glycol} \ldots \text{acid}$$

Another way of stating the matter is that the composition may be indicated in the following manner:

$$\text{TOOC.D.COO}[(C_2H_4O)_{m-1}C_2H_4OOC.D.COO]_xT$$

in which the characters have their previous significance and $x$ is a relatively small whole number less than 10 and probably less than 5; and in the monomeric form $x$, of course, is 1. The limitations on the size of $x$ are probably influenced largely by the fact that reaction leading to further growth is dependent upon random contact.

Some of the products are self-emulsifiable oils or self-emulsifiable compounds; whereas, others give cloudy solutions or sols; and the most desirable type is characterized by giving a clear solution in water, and usually in the presence of soluble calcium or magnesium salts, and frequently in the presence of significant amounts of either acids or alkalies.

Water solubility can be enhanced in a number of ways which have been suggested by previous manufacturing directions, for instance:

(a) By using a more highly polymerized ethylene glycol;

(b) By using a polymeric form instead of a monomeric form in regard to the unit which forms the chain between the two alcoholic nuclei;

(c) By using a polybasic carboxy acid of lower molecular weight, for instance, maleic acid instead of adipic acid;

(d) By using an alcoholic material of lower molecular weight, for instance, ricinoleoamide, instead of the amide of a hydroxylated wax acid of a higher molecular acid, or instead of a substituted amide, such as amyl ricinoleoamide.

In any event, it is to be noted that the compounds of the type herein contemplated are limited to the water-soluble type, i. e., those which are self-emulsifying in water, or produce a sol or a molecular solution.

Actually, a reaction involving an alcohol and an acid (esterification) may permit small amounts of either one or both of the reactants, depending upon the predetermined proportion, to remain in an unreacted state. In the actual preparation of compositions of the kind herein contemplated any residual acidity can be removed by any suitable base, for instance, ammonia, triethanolamine, or the like, especially in dilute solution. Naturally, precaution should be taken so that neutralization takes place without saponification or decomposition of the ester. In some cases there is no objection to the presence of the acidic group. Indeed, if a tribasic acid be employed in such a manner as to leave one free carboxyl group, then it is usually desirable to neutralize such group by means of a suitable basic material.

In the hereto appended claims, reference to a neutral product refers to one in which free carboxylic radicals are absent.

Materials of the kind herein contemplated may find uses as wetting, detergent, and leveling agents in the laundry, textile, and dyeing industry; as wetting agents and detergents in the acid washing of fruit, in the acid washing of building stone and brick; as a wetting agent and spreader in the application of asphalt in road building and the like, as a constituent of soldering flux preparations; as a flotation reagent in the flotation separation of various minerals; for flocculation and coagulation of various aqueous suspensions containing negatively charged particles such as sewage, coal washing waste water, and various trade wastes and the like; as germicides, insecticides, emulsifiers for cosmetics, spray oils, water-repellent textile finish, etc. These uses are by no means exhaustive.

However, the most important phase of the present invention, as far as industrial application goes, is concerned with the use of the materials previously described as demulsifiers for water-in-oil emulsions, and more specifically, emulsions of water or brine in crude petroleum.

We have found that the particular chemical compounds or reagents herein described and desirable for use as demulsifiers, may also be used for other purposes, for instance, as a break inducer in doctor treatment of the kind intended to sweeten gasoline. See U. S. Patent No. 2,157,223, dated May 9, 1939, to Sutton.

Chemical compounds of the kind herein described are also of value as surface tension depressants in the acidization of calcareous oil-bearing strata by means of strong mineral acid, such as hydrochloric acid. Similarly, some members are effective as surface tension depressants or wetting agents in the flooding of exhausted oil-bearing strata.

As to using compounds of the kind herein described as flooding agents for recovering oil from subterranean strata, reference is made to the procedure described in detail in U. S. Patent No. 2,226,119, dated December 24, 1940, to De Groote and Keiser. As to using compounds of the kind herein described as demulsifiers, or in particular as surface tension depressants in combination with mineral acid or acidization of oil-bearing strata, reference is made to U. S. Patent No. 2,233,383, dated February 25, 1941, to De Groote and Keiser.

It will be apparent to those skilled in the art that residual carboxyl acidity can be eliminated by esterification with a low molal alcohol, for instance, ethyl, methyl, or propyl alcohol, by conventional procedure, so as to give a substantially neutral product. The introduction of such low molal hydrophobe groups does not seriously affect the solubility, and in some instances gives increased resistance, to soluble calcium and magnesium salts, for such property is of particular value. Usually, however, neutralization with a dilute solution of ammonia or the like is just as practicable and less expensive. What has been said previously can be recapitulated and presented in more formal agreement with customary nomenclature in the following manner: As stated previously, in the broadest aspect, the polyalkylene glycols employed may be indicated by the following formula:

$$OH(C_nH_{2n}O)_mH$$

in which $m$ has its previous significance, and $n$ represents a numeral varying from 2 to 4. In similar form this structure can be indicated in the following manner:

$$HO-R-OH$$

in which the divalent radical $-RO-$ is the divalent radical $-(C_nH_{2n}O)_m-$ as previously defined.

The dibasic acid previously referred to, in its simplest form as HOOC.D.COOH, is more completely portrayed by the following formula:

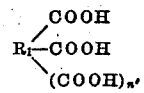

in which $R_1$ is the polybasic carboxy acid residue, except in the unique case of oxalic acid, and $n'$ is the numeral 0 or 1, depending on whether or not the polybasic acid is dibasic or tribasic.

If the polybasic acid just described is indicated by R', and if the glycol just described is indicated by R'', then the acidic or fractional ester previously described in the specification may be indicated by the following formula:

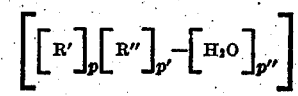

in which $p$ and $p'$ represent numerals varying from 1 to 10, and $p''$ represents a numeral varying from 1 to 20, and $R'$ and $R''$ have their prior significance, and the ratio of $p$ to $p'$ varies from 2:1 to $p+1:p'$, with the obvious proviso that such acidic ester must contain at least two free carboxyl radicals.

Similarly, the high molal hydroxy amide may be indicated by the following formula:

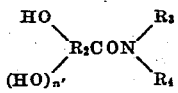

in which

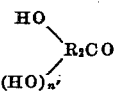

is the acyl radical of the high molal hydroxy acid, having at least 11 and not more than 36 carbon atoms, and $n$ has its prior significance, i. e., being the numeral 0 or 1, depending on whether the acid is monohydroxylated or dihydroxylated, and $R_3$ and $R_4$ are selected from the class of hydrogen atoms, and hydrocarbon radicals having not over 7 carbon atoms, and may be the same or different.

The new composition of matter herein contemplated is best represented as an ester obtained by the esterification reaction involving the acidic fractional ester above described and the hydroxylated amide previously mentioned. The final composition may be obtained in any suitable manner and would properly represent the final product, regardless of the succession of the intermediate steps. So portrayed, the structural formula is as follows:

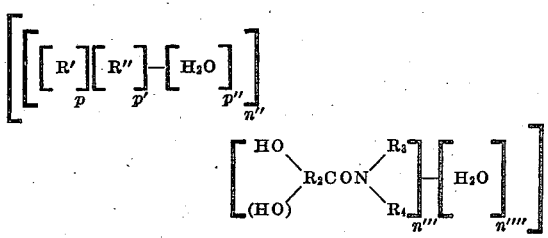

in which all of the characters have their prior significance, and $n''$ represents a numeral varying from 1 to 3, and $n'''$ represents a numeral varying from 1 to 4.

It has been previously pointed out in the specification that any residual carboxylic radicals, and especially one obtained from tribasic acids, could be neutralized with a variety of suitable basic materials. In other words, a residual carboxylic atom may be replaced by a metallic atom, an ammonium radical, or substituted ammonium radicals, as previously indicated. Under such circumstances, any residual carboxylic radical, instead of appear thus: COOH, may, in essence, be the radical COOR₅ in which $R_5$ represents a cation including the acidic hydrogen atom. This can be best disposed of by rewriting the formula for the polybasic carboxy acid, thus:

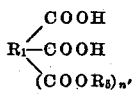

in which all of the characters have their prior significance.

Having thus described our invention, what we claim as new and desire to secure by Letters Patent is:

1. A water-soluble ester of the formula:

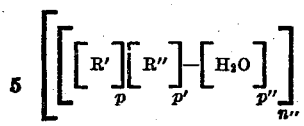

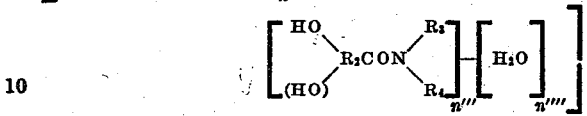

in which $n'$ represents the number 0 or 1, $n''$ represents a numeral varying from 1 to 3, and $n'''$ represents a numeral varying from 1 to 4, $n''''$ represents a numeral varying from 1 to 4, and in which $p$ and $p'$ represent numerals varying from 1 to 10, and the ratio of $p$ to $p'$ varies from 2:1 to $p+1:p'$, and $p''$ represents a numeral varying from 1 to 20, and $R'$ is a glycol of the formula HO—R—OH in which the divalent radical —RO— is the divalent radical —$(C_nH_{2n}O)_m$— in which radical, in turn, $n$ represents a numeral varying from 2 to 4, and $m$ represents a numeral varying from 7 to 17; $R''$ is the polycarboxy acid

in which $R_1$ is the polycarboxy acid residue, and $R_5$ is a cation, and as previously, $n'$ is the numeral 0 or 1;

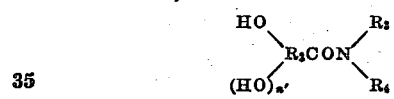

is an amide in which

is the acyl radical of a high molal hydroxy acid having at least 11 and not more than 36 carbon atoms, and $n'$ is the numeral 0 or 1, and $R_3$ and $R_4$ are selected from the class of hydrogen atoms and hydrocarbon radicals having not over 7 carbon atoms.

2. A water-soluble ester, as defined in claim 1, wherein all occurrences of $n'$ are 0.

3. A water-soluble ester, as defined in claim 1, wherein all occurrences of $n'$ are 0, and $n$ represents the numeral 2.

4. A water-soluble ester, as defined in claim 1, wherein all occurrences of $n'$ are 0, $n$ represents the numeral 2, and $m$ represents a numeral varying from 7 to 11.

5. A water-soluble ester, as defined in claim 1, wherein all occurrences of $n'$ are 0, $n$ represents the numeral 2, $m$ represents a numeral varying from 7 to 11, and $R_2CO$ is an 18 carbon atom fatty acid residue.

6. A water-soluble ester, as defined in claim 1, wherein all occurrences of $n'$ are 0, $n$ represents the numeral 2, $m$ represents a numeral varying from 7 to 11, $R_2CO$ is an 18 carbon atom fatty acid residue, and the ratio of $p$ to $p'$ is 2 to 1.

7. A water-soluble ester, as defined in claim 1, wherein all occurrences of $n'$ are 0, $n$ represents the numeral 2, $m$ represents a numeral varying from 7 to 11, $R_2CO$ is an 18 carbon atom fatty acid residue, the ratio of $p$ to $p'$ is 2 to 1, and with added neutralization of all residual acidity.

8. A water-soluble ester, as defined in claim 1, wherein all occurrences of $n'$ are 0, $n$ represents the numeral 2, $m$ represents a numeral varying from 7 to 11, $R_2CO$ is a ricinoleic acid residue, the ratio of $p$ to $p'$ is 2 to 1, and with added neutralization of all residual acidity.

9. A water-soluble ester, as defined in claim 1, wherein all occurrences of $n'$ are 0, $n$ represents the numeral 2, $m$ represents a numeral varying from 7 to 11, $R_2CO$ is a ricinoleic acid residue, the ratio of $p$ to $p'$ is 2 to 1, with added neutralization of all residual acidity, and $R_1$ is an adipic acid residue.

10. A water-soluble ester, as defined in claim 1, wherein all occurrences of $n'$ are 0, $n$ represents the numeral 2, $m$ represents a numeral varying from 7 to 11, $R_2CO$ is a ricinoleic acid residue, the ratio of $p$ to $p'$ is 2 to 1, with added neutralization of all residual acidity, and $R_1$ is a succinic acid residue.

11. A water-soluble ester, as defined in claim 1, wherein all occurrences of $n'$ are 0, $n$ represents the numeral 2, $m$ represents a numeral varying from 7 to 11, $R_2CO$ is a ricinoleic acid residue, the ratio of $p$ to $p'$ is 2 to 1, with added neutralization of all residual acidity, and $R_1$ is a maleic acid residue.

12. In the manufacture of the esterification product of the kind described in claim 1, the steps of: (A) esterifying a polyalkylene glycol having at least 7 and not more than 17 ether linkages, and the alkylene radical thereof containing at least 2 and not more than 6 carbon atoms, with a polybasic carboxy acid having not more than 6 carbon atoms, in a predetermined ratio of more than one and not over 2 moles of the polybasic acid for each mole of the glycol, to produce a water-soluble product; and (B) reacting one mole of the aforementioned polybasic compound produced by esterification, with two moles of the amide of a high molar hydroxy acid having at least 11 carbon atoms and not more than 36 carbon atoms, and containing at least one hydroxyl radical as part of the acyl group, so as to produce a water-soluble product.

MELVIN DE GROOTE.
BERNHARD KEISER.